United States Patent
Jahan et al.

(10) Patent No.: US 12,372,935 B2
(45) Date of Patent: *Jul. 29, 2025

(54) LOAD CONTROL WITH INTEGRAL CONTROL INTERFACE

(71) Applicant: Leviton Manufacturing Co., Inc., Melville, NY (US)

(72) Inventors: A. M. Sarwar Jahan, Jamaica, NY (US); Abhishek D. Golwala, Northvale, NJ (US); Ankit Milan Sanghvi, Hicksville, NY (US); Abrar Quazi, Melville, NY (US); Michael Ross, Melville, NY (US)

(73) Assignee: Leviton Manufacting Co., Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,303

(22) Filed: Oct. 16, 2023

(65) Prior Publication Data

US 2024/0053716 A1 Feb. 15, 2024

Related U.S. Application Data

(63) Continuation of application No. 17/483,992, filed on Sep. 24, 2021, now Pat. No. 11,815,868.
(Continued)

(51) Int. Cl.
*G05B 19/042* (2006.01)
*G08B 5/22* (2006.01)
*G06F 3/02* (2006.01)

(52) U.S. Cl.
CPC ........... *G05B 19/042* (2013.01); *G08B 5/22* (2013.01); *G05B 2219/2639* (2013.01); *G06F 3/0202* (2013.01)

(58) Field of Classification Search
None
See application file for complete search history.

(56) References Cited

U.S. PATENT DOCUMENTS

| | | | |
|---|---|---|---|
| 4,399,513 | A | 8/1983 | Sullivan et al. |
| 4,644,484 | A | 2/1987 | Flynn et al. |
| 4,649,323 | A | 3/1987 | Pearlman et al. |

(Continued)

FOREIGN PATENT DOCUMENTS

DE 3143446 A1 5/1983

OTHER PUBLICATIONS

Leviton Manufacturing Corporation, Inc., "Touchpoint Brochure", (Year: 1999) (4 pages).

*Primary Examiner* — Jason Lin
(74) *Attorney, Agent, or Firm* — Kevin P. Radigan, Esq.; Heslin Rothenberg Farley & Mesiti P.C.

(57) ABSTRACT

A load control is provided which includes a wall-box housing, an electrical device to control electrical power to a load, a controller to control the electrical device, and a control interface. The controller is user-programmable and includes a saved settings data structure having multiple columns and rows of control settings. The control interface has first and second button switches to respectively select a column and row of the settings data structure in a settings mode of the controller. The button switches include respective electro-mechanical devices and are selectable by a user without disassembly of the load control. The control interface also includes one or more light indicators to signal the selected column of the settings data structure in the settings mode of the control, and to differently signal the selected row of the settings data structure.

17 Claims, 13 Drawing Sheets

Related U.S. Application Data

(60) Provisional application No. 63/120,423, filed on Dec. 2, 2020.

(56) References Cited

U.S. PATENT DOCUMENTS

| | | | |
|---|---|---|---|
| 4,695,739 | A | 9/1987 | Pierce |
| 4,779,071 | A | 10/1988 | Guglielmo |
| 4,990,908 | A | 2/1991 | Tung |
| 5,036,214 | A | 7/1991 | Zerillo |
| 5,189,412 | A | 2/1993 | Mehta et al. |
| 7,579,566 | B2 | 8/2009 | Sloan |
| 7,683,755 | B2 | 3/2010 | Ostrovsky et al. |
| 7,745,750 | B2 * | 6/2010 | Hewson ............... H01H 3/0213 200/315 |
| 8,558,964 | B2 * | 10/2013 | Bedingfield ......... H05K 9/0096 349/59 |
| 9,788,389 | B1 * | 10/2017 | Walma ................ H05B 45/60 |
| 2008/0020632 | A1 * | 1/2008 | Gorman ............... H02G 3/128 439/535 |
| 2008/0079568 | A1 * | 4/2008 | Primous .............. A61F 2/4611 340/541 |
| 2009/0213698 | A1 * | 8/2009 | Ostrovsky ............ G04C 23/44 368/10 |
| 2010/0293462 | A1 * | 11/2010 | Bull ..................... G06F 9/452 715/716 |
| 2011/0012734 | A1 * | 1/2011 | Reese ................. G08B 13/2491 340/541 |
| 2011/0175569 | A1 * | 7/2011 | Austin ................. B60L 53/126 320/109 |
| 2011/0267277 | A1 * | 11/2011 | Balch .................. G06F 3/04886 345/169 |
| 2012/0286940 | A1 | 11/2012 | Carmen, Jr. et al. |
| 2014/0324229 | A1 * | 10/2014 | Leen .................... G05D 23/19 700/276 |
| 2016/0128165 | A1 | 5/2016 | Carberry et al. |
| 2016/0148487 | A1 * | 5/2016 | Thomas ............... G05B 15/02 340/686.6 |
| 2016/0154576 | A1 * | 6/2016 | Moore ................. G06F 3/04847 715/708 |
| 2018/0122600 | A1 * | 5/2018 | Jansen ................. H01H 23/025 |
| 2019/0154499 | A1 * | 5/2019 | Buckley .............. G01J 1/0437 |
| 2020/0402374 | A1 * | 12/2020 | Child ................... H04L 12/2829 |
| 2022/0171355 | A1 | 6/2022 | Jahan et al. |

* cited by examiner

| OPTION NUMBER | TIMER (DURATION OF TIME FOR WHICH LOAD IS ON SINCE LAST DETECTED MOTION) | SENSITIVITY (SENSITIVITY TO MOTION - ADJUSTING THE MAJOR AND MINOR DETECTION RANGE) | LOAD CONTROL WITH AMBIENT LIGHT SENSING (IF THE ROOM IS BRIGHTER THAN THE SETTING SELECTED, THE LOAD WILL NOT TURN ON) |
|---|---|---|---|
| OPTION 1 | 1 MINUTE | LOW (50% RANGE) | LOW LIGHT LEVEL |
| OPTION 2 | 5 MINUTE | MEDIUM | MEDIUM LIGHT LEVEL |
| OPTION 3 | 10 MINUTE | HIGH | HIGH/BRIGHTEST LIGHT LEVEL |
| OPTION 4 | 20 MINUTE | ALL SETTINGS TO DEFAULT | DISABLE - TURNS ON FOR ALL LIGHT LEVELS |

SETTING TYPES AND OPTIONS (DEFAULTS ARE IN BOLD)

FIG. 3B

LOAD CONTROL WITH INTEGRAL CONTROL INTERFACE

BACKGROUND

A wide variety of electrical load controls are commercially available for residential and commercial applications with various configurations and features. By way of example, load controls with integral or associated sensors, such as occupancy sensors, vacancy sensors, environmental sensors, etc., are available in a variety of configurations and features. In one or more implementations, such load controls can include one or more user-adjustable settings. For instance, in a commercial market application, the load control might be adjustable by provision of a wireless communication capability to an electronic interface to allow, for instance, a building management system to communicate with the load control. In a residential market application, a wireless communication capability is commonly omitted, with one or more settings typically being selectable by a user by partially disassembling or opening the load control to gain access to one or more setting inputs using an appropriate tool.

SUMMARY

Certain shortcomings of the prior art are overcome and additional advantages are provided through the provision, in one or more aspects, of a load control which includes a wall-box housing, an electrical device to control electrical power to a load, and a controller to control the electrical device. The electrical device and the controller are disposed, at least in partially, within the wall-box housing, and the controller is operatively coupled to control operation of the electrical device in an operational mode. The controller is user-programmable in a settings mode via a saved settings data structure which includes multiple columns and rows of control settings. The load control also includes a control interface, which includes a first button switch, a second button switch, and one or more light indicators. The first button switch is to select a column of the settings data structure in the settings mode of the controller for user-programming of the controller, with the first button switch including a first electro-mechanical device and being selectable by a user without disassembly of the load control. The second button switch is to select a row of the settings data structure in the settings mode of the controller for user-programming of the controller, with the second button switch including a second electro-mechanical device and being selectable by the user without disassembly of the load control. The one or more light indicators signal a selected column of the settings data structure in the settings mode of the controller, and signal a selected row of the settings data structure in the settings mode of the controller.

In another aspect, a load control is provided which includes a wall-box housing, an electrical device to control electrical power to a load, a controller to control the electrical device, and a control interface. The electrical device and the controller are disposed, at least partially, within the wall-box housing, and the controller is operatively coupled to control operation of the electrical device in an operational mode, and is user-programmable in a settings mode via a saved settings data structure which includes multiple columns and rows of control settings. The control interface includes a first button switch, a second button switch, and one or more light indicators. The first button switch is to select a column of the settings data structure in the settings mode of the controller for user-programing of the controller, with the first button switch including a first electro-mechanical device, and being selectable by a user without disassembly of the load control. The second button switch is to select a row of the settings data structure in the settings mode of the controller, with the second button switch including a second electro-mechanical device, and being selectable by the user without disassembly of the load control for user-programming of the controller. The one or more light indicators signal a selected column of the settings data structure in the settings mode of the controller, and signal a selected row of the settings data structure in the settings mode of the controller. Further, the user enters the settings mode of the controller by pressing and holding the first button switch, the second button switch, or both the first and second button switches, for a predefined time interval.

In a further aspect, a load control is provided which includes, for instance, a wall-box housing, an electrical device to control electrical power to a load, a sensing element, a controller to control the electrical device, and a control interface. The electrical device and the controller are disposed, at least partially, within the wall-box housing. The sensing element is to sense a condition of a monitored space, and the controller is operatively coupled to the sensing element and the electrical device. The controller controls operation of the electrical device in an operational mode based, at least in part, on a sensed condition of the monitored space. The controller is user-programmable in a settings mode via a saved settings data structure which includes multiple columns and rows of control settings. The control interface includes a first button switch, a second button switch, and one or more light indicators. The first button switch is to select a column of the settings data structure in the settings mode of the controller for user-programming of the controller, with the first button switch including a first electro-mechanical device, and being selectable by the user without disassembly of the load control. The second button switch is to select a row of the settings data structure in the settings mode of the control, with the second button switch including a second electro-mechanical device, and being selectable by the user without disassembly of the load control for user-programming of the controller. The one or more light indicators signal the selected column of the settings data structure in the settings mode of the controller, and differently signal the selected row of the settings data structure in the settings mode of the controller.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3B depicts one embodiment of a settings data structure traversable by a user via a control interface for user-programming of the load control, in accordance with one or more aspects of the present invention;

DETAILED DESCRIPTION

Figure 1:
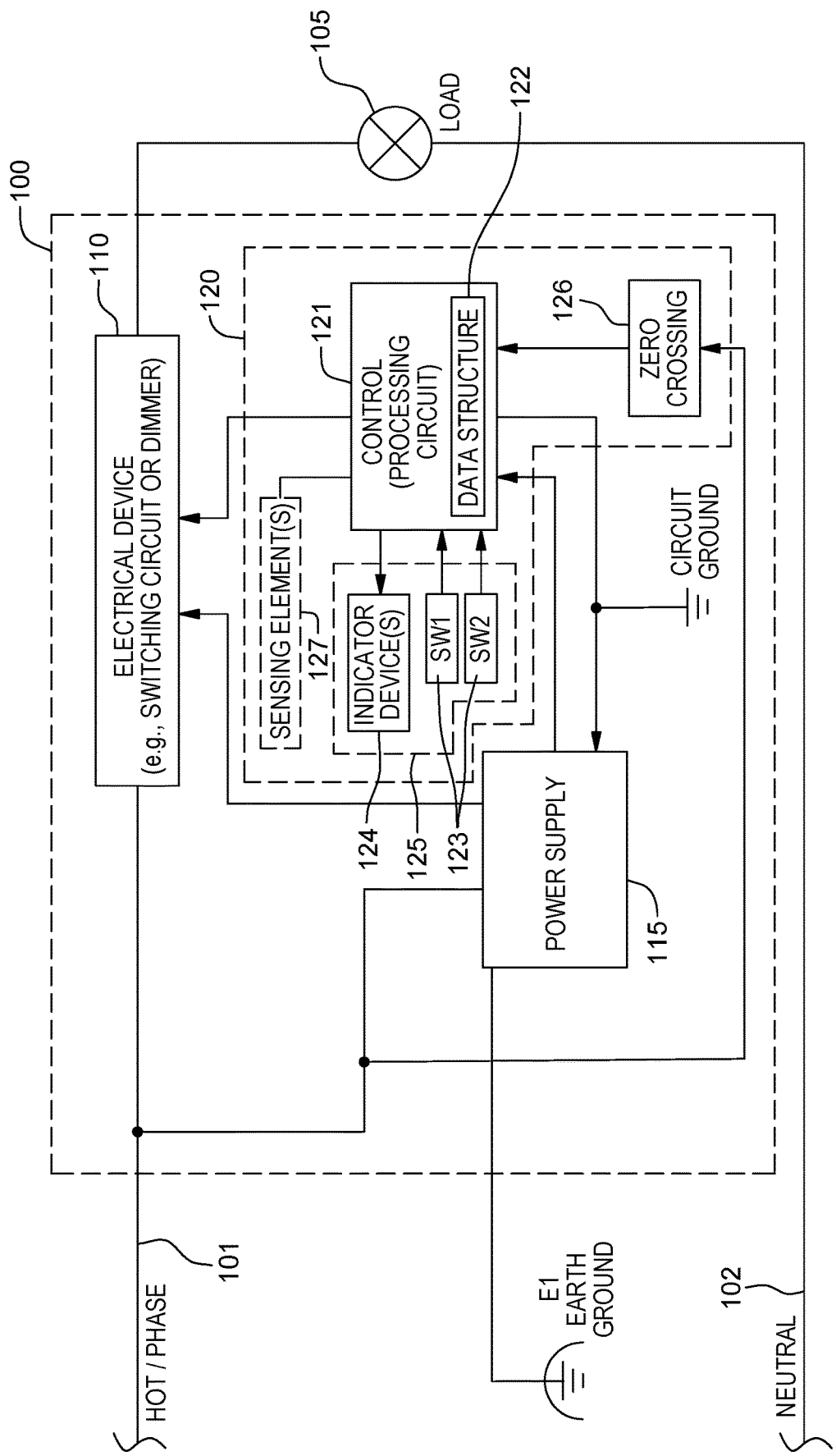
FIG. 1 is a schematic of one embodiment of a load control with a control assembly including an integral control interface, in accordance with one or more aspects of the present invention.

The accompanying figures, in which like reference numerals refer to identical or functionally similar elements throughout the separate views, illustrate embodiments of the present invention, and together with this detailed description of the invention, serve to explain aspects of the present invention. Note in this regard that, descriptions of well-known systems, devices, components, fabrication techniques, etc., are omitted so as not to unnecessarily obscure the invention in detail. It should be understood, however, that the detailed description and the specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable within the other disclosed aspect or feature as desired for a particular application of the concepts disclosed herein.

In addition, note that although load controls with integral control interfaces are described herein, by way of example, with reference to a load control with a sensing element, such as an occupancy-sensing element, the load control can be any of a variety of load controls, either with sensing capability, such as in the case of an occupancy sensor, vacancy sensor, ambient light sensor, humidity sensor, environmental sensor, or other type of sensor for a monitored space, or without sensing capability, such as may be the case with a dimmer-type load control with one or more user-programmable features.

As noted, in many embodiments load controls can have multiple user-configurable or programmable settings. In a commercial market application, a load control is often provided with communication capability to, for instance, an electronic interface, to allow for remote access or programming of the control. In a residential market application, however, external communication capability and/or an electronic interface are typically omitted from the load control, with one or more control settings being programmable by a user partially disassembling or opening the load control, for instance, by removing a wall plate and/or cover (in a wall-mount application), to access one or more setting control inputs using an appropriate tool.

By way of enhancement, disclosed herein are electrical load controls which include, in one or more embodiments, a control assembly having a control and a control interface. The control is user-programmable via the control interface and a saved settings data structure, and the control interface is accessible by a user for configuring or programming the control without any disassembly or opening of the load control, including without removal of a wall plate or other cover. Advantageously, the load controls disclosed have integral control interfaces through which a user can navigate a settings data structure (or table of program settings) in a settings mode of the control, using two or more button switches and one or more indicator devices, such as one or more indicator lights, included as part of the control assembly and engageable or otherwise accessible to the user without any disassembly of the load control. A two-button switch application is disclosed herein (by way of example), which allows a user to select different control settings for the load control from the settings data structure, with the user navigating through the columns of the settings data structure using a first button switch, and the rows of the settings data structure using a second button switch. The one or more indicator devices provide in the settings mode feedback on the column and row position that the user is currently in within the settings data structure. In one or more embodiments, the one or more indicator devices include first and second indicator lights, such as first and second light-emitting diodes (LEDs), that respectively flash the current column and/or row position within the settings data structure when the control is in a settings mode, using a flashing or blinking pattern. Further, in certain embodiments, the one or more indicator devices can be used by the control to signal when settings mode has been entered or exited, as well as to signal when a selected settings option has been saved, for instance, to user-configure one or more selectable control features. The control interface disclosed herein is advantageously intuitive since it allows a user to navigate through the settings data structure using the two separate button switches, and receive feedback on the user's current position within the data structure, for instance, responsive to the user advancing to a next column or next row in the data structure.

Note that the control interface disclosed herein provides the user with feedback without any graphical interface, display screen, or other electronic interface or device. Further, note that the control interface disclosed allows a user to access different sized data structures or tables, meaning that the control interface can be used across a variety of load controls, with different sized data structures (e.g., different sized lookup tables or programming tables).

In addition, the first and second button switches can be used to enter multiple different control modes. In one implementation, a settings mode, or program settings mode, can be entered by pressing the first and second buttons together for a predefined time interval, and then navigating through the columns and rows of the settings data structure using single presses of the first and second button switches. This advantageously allows other features of the sensor assembly to be accessed by pressing (and holding for a predefined time interval) the first button switch or the second button switch, thereby allowing greater accessibility to the control operations without any disassembling of the load control, for instance, without removing or opening a wall plate, other cover or other component of the load control.

In one or more embodiments of the present invention, a load control is provided which includes a wall-box mounted housing, an electrical device to control electrical power to a load, and a control assembly to control the electrical device. The electrical device and the control assembly are disposed, at least partially, within the wall-box mounted housing. The control assembly includes a control and a control interface. The control is operatively coupled to control operation of the electrical device in an operational mode, and the control is user-programmable in a settings mode via a saved settings data structure which includes multiple control settings. In one embodiment, the settings data structure includes multiple columns and rows of control settings. The control interface includes a first button switch, a second button switch, and one or more indicator devices. The first button switch is engageable by a user to selectively advance through the columns of the settings data structure in the settings mode of the control for user-programming of the control, and the second button switch is engageable by the user to selectively advance through the rows of the setting data structure in the settings mode of the control for user-programing of the control. Advantageously, the first and second button switches are selectable by the user without any disassembly of the load control. The one or more indicator devices signal, at least in part, a column of the settings data structure to which the control has been advanced in the settings mode of the control, and differently signal a row of the settings data structure to which the control has been advanced in the settings mode of the control.

One or more of a variety of indicator devices can be used as part of the control interface to, at least in part, signal the particular column and row of the settings data structure to which the control has been advanced in the settings mode. For instance, visual and/or audio signals can be used. In the case of visual signals, one or more indicators can be included to provide different light signals, and/or different indicator light devices could be utilized to provide different light location signals. For instance, in the case of light-based signal feedback, different light color signals and/or different light location signals (of the same or different colors) can be used to provide the indication of the column and/or row to which the user has advanced in the settings mode of the control.

By way of example, in certain embodiments of the present invention, the one or more indicator devices include one or more indicator lights, with the one or more indicator lights signaling in a first color (e.g., red) the column of the settings data structure to which the control has been advanced in the settings mode of the control, and signaling in a second color (e.g., green) the row of the settings data structure to which the control has been advanced in the settings mode. In one or more other implementations, the one or more indicator devices can include a first indicator device in a first location to, at least in part, signal a column of the settings data structure to which the control has been advanced in the settings mode of the control, and a second indicator device in a second location to, at least in part, signal a row of the settings data structure to which the control has been advanced in the settings mode of the control. For instance, the first indicator can include one or more first indicator lights, and the second indicator can include one or more second indicator lights. In one embodiment, the first indicator light(s) signal(s) the column of the settings data structure in the settings mode of the control by at least one of flashing a number of times corresponding to location of the column within the settings data structure or signaling a color corresponding to location of the column within the settings data structure, and the second indicator light(s) signal(s) the row of the settings data structure in the settings mode of the control by at least one of flashing a number of times corresponding to location of the row within the settings data structure or signaling a color corresponding to location of the column within the settings data structure to which the user has advanced.

By way of further example, in one or more embodiments, the one or more indicator devices include an indicator device which signals different colors for different column locations to which the user has advanced, or different row locations to which the user has advanced within the settings data structure. In one embodiment, the indicator device signals different colors for different column locations within the settings data structure, and signals different numbers of flashes for different row locations within the settings data structure. In another embodiment, the indicator device signals different numbers of flashes for different column locations within the settings data structure, and signals different colors for different row locations within the settings data structure. In one embodiment, the indicator device includes an optical element, such as a light-pipe, and the different colors for the different column locations or different row locations within the settings data structure are signaled through the optical element.

In one or more embodiments, where the one or more indicator devices include one or more indicator lights, the one or more indicator lights can be, or include, one or more light-emitting diodes (LEDs). For instance, in one embodiment, a single indicator light device can be provided which includes a bi-color, light-emitting diode. In another embodiment, two or more light-emitting diodes of different colors can be utilized as part of the control interface. For instance, in one or more embodiments, two or more light-emitting diodes of different colors can be utilized as part of a common control interface, where the two or more light-emitting diodes signal different colors through a common optical element of the indicator device. For instance, in one embodiment, the two or more light-emitting diodes can include a first color diode and a second color diode to signal through the optical element a first color, a second color, or a third color, with the third color being a combination of the first and second colors. Other variations will be apparent to those skilled in the art. Further, in certain embodiments, the one or more indicator devices can be used by the control to signal when settings mode has been entered or exited, as well as to signal when a selected settings option has been saved, for instance, to user-configure one or more selectable control features.

By way of further explanation, FIG. 1 depicts a block diagram of one embodiment of a load control 100, in accordance with one or more aspects of the present invention. In one or more implementations, load control 100 is, for instance, a wall-box mounted load control. In the embodiment illustrated, load control 100 includes an electrical device 110, to control electrical power to a load 105, and a control assembly 120 to control the electrical device.

As illustrated, load control 100 is electrically connected between a power source, including a hot/phase line 101, a neutral line 102 and an earth ground µl, and load 105. In one or more embodiments, load 105 can be a lighting load, fan load, and/or other type of load. By way of example only, one detailed embodiment of a load control is depicted in FIGS. 4-7B and described further below.

In the embodiment illustrated, load control 100 includes a power supply 115 to, for instance, convert AC electrical power on hot/phase line 101 to one or more desired DC level voltages for powering electrical device 110 and/or control assembly 120. For instance, in one or more embodiments, control 121 can utilize a 1.8-5V DC voltage, such as 3V DC power, and electrical device 110 can be, in one or more implementations, an electrical switching circuit with an electrical relay driven by, for instance, 7.5V or 15V DC power, both of which can be supplied by power supply 115.

Figure 8:
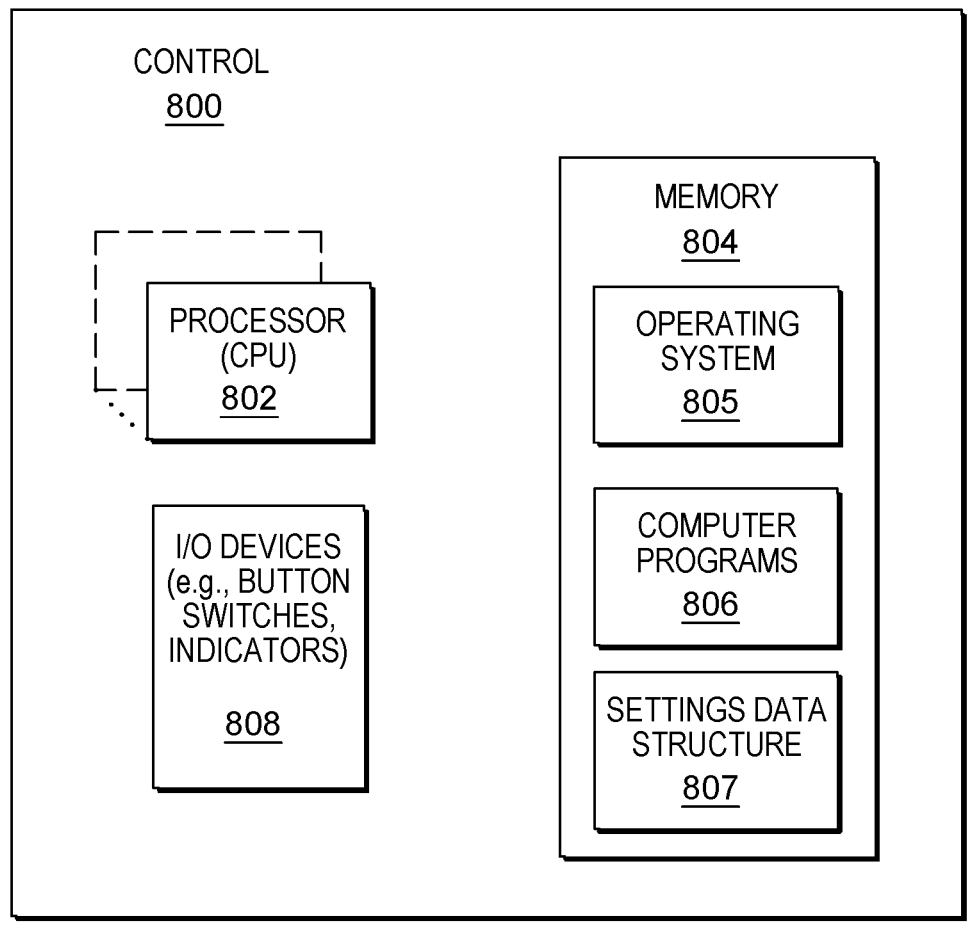
FIG. 8 is a block diagram of one embodiment of a control of a load control, in accordance with one or more aspects of the present invention.

In one or more embodiments, control assembly 120 includes control 121, such as a processing circuit or processor, to control the electrical device based on program code. For instance, in one or more implementations, program code executing on one or more processors within control 121 controls operation of electrical device 110 in an operational mode. The control is, in one embodiment, user-programmable in a settings mode via a saved settings data structure 122 associated with the control, such as saved to memory within control 121 or memory accessible by control 121. Note that, as understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 8 as computer programs 806, which reference one or more settings data structures 807, both of which can be stored in memory 804.

In the embodiment of FIG. 1, load control 100 further includes an integral central interface 125 (such as disclosed herein) which includes first and second switches 123, such as first and second button switches or contact switches, and one or more indicator devices 124, including (for instance) one or more indicator lights (such as one or more light-emitting diodes (LEDs)). In one embodiment, zero crossing circuitry 126 is also provided to, for instance, generate a time signal for control 121 where, for instance, one or more predefined time intervals are used in association with first and second button switches 123, such as to determine by control 121 whether the user wishes to enter a special mode of the control assembly, or to return to normal operational mode, such as might be the case after a defined amount of time has elapsed after a user has last provided input via the first and/or second switches 123.

Depending on the load control embodiment, control assembly 120 can include one or more sensing elements 127 for sensing one or more conditions within a monitored space. For instance, one or more sensing elements 127 can include one or more of an occupancy sensor, vacancy sensor, ambient light sensor, environmental sensor, or other type of sensor, for the monitored space. In certain embodiments, the one or more sensing elements 127 include an occupancy sensor configured to detect motion within the monitored space, with the control assembly 120 controlling electrical device 110 to switch load 105 between an ON state and an OFF state depending on the presence or absence of motion within the monitored space. For instance, when motion is detected within an area of coverage, the load can be automatically turned ON by such an occupancy-sensing load control. Alternatively, when no motion is detected, indicating the area of coverage is not occupied, the load can be automatically turned OFF by the occupancy-sensing load control after a predetermined period of time. As noted, however, an occupancy sensor is one example only of a sensing element that can be used in association with control assembly 120, or not, as may be the case with a dimmer application.

In one or more embodiments, control 121 is user-programmable via a saved settings data structure 122, and the control interface 125 is accessible by a user for configuring or programming control 121 without any disassembly or opening of load control 100, including without removal of a wall plate, cover or other component of the load control. In one or more embodiments, switches 123 are accessible either directly on the face of the load control, or indirectly, such as via a button cover and respective, flexible force transfer members, as described herein. Advantageously, the control interface disclosed herein allows a user access to different sized data structures or tables, meaning that the control interface can be used across a variety of load controls, with different types and different sized data structures (e.g., different sized lookup tables or programming tables). In addition, control 121 is configured, in one or more embodiments, so that a user can enter any of a variety of different control modes via the first and second button switches 123 of control interface 125.

Figure 2:
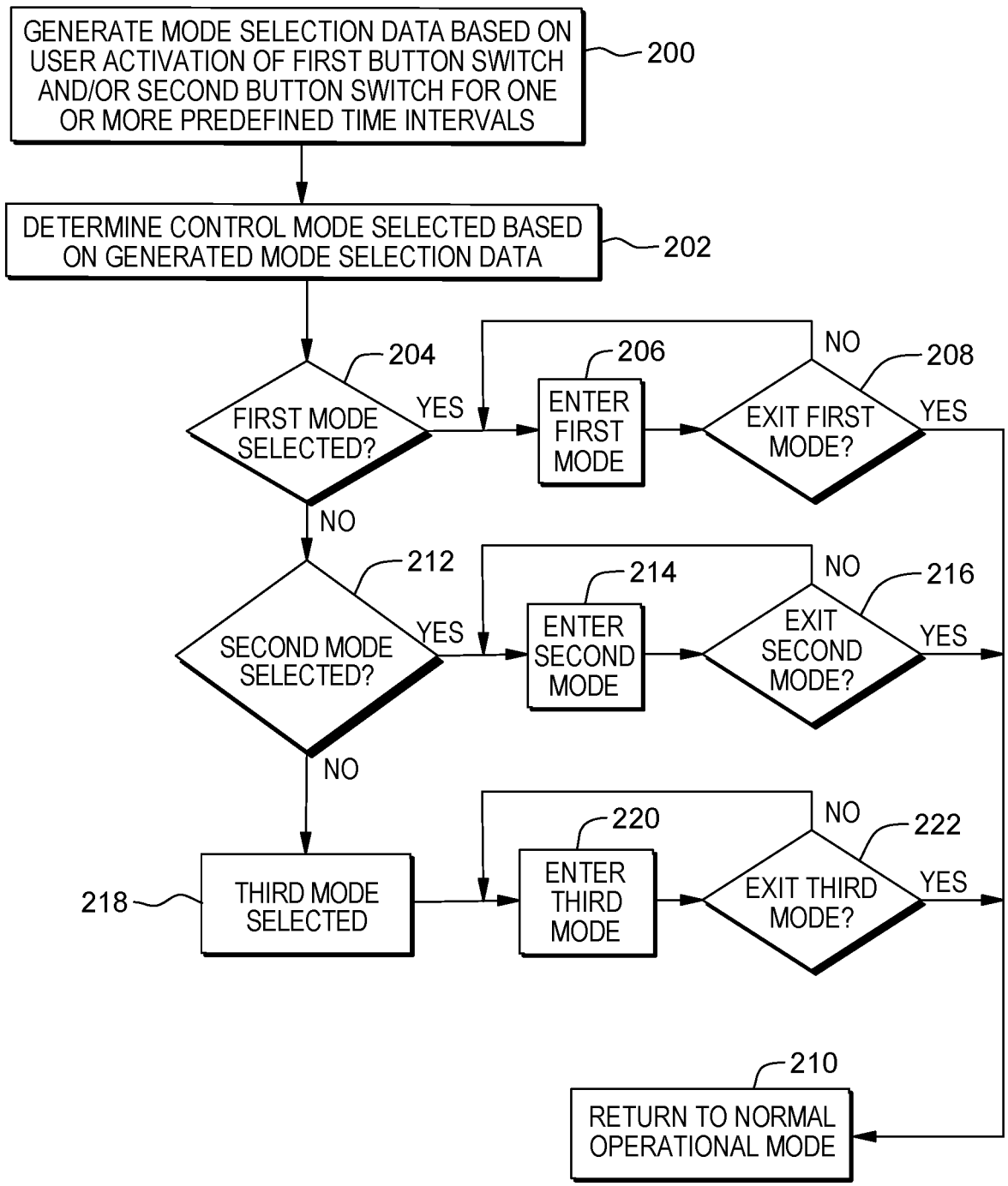
FIG. 2 depicts one embodiment of a control mode selection process of a load control, where the control includes multiple control modes selectable by a user via an integral control interface, in accordance with one or more aspects of the present invention.

By way of example only, FIG. 2 depicts one embodiment of control processing, where the first and second button switches or contacts are used by a user to enter one of multiple control modes of the load control, with a first mode, second mode, and third mode being illustrated by way of example. As shown, mode selection data is generated based on user-activation of the first button switch and/or second button switch for one or more predefined time intervals 200. For instance, each control mode can have its own predefined time interval by which the corresponding first button switch and/or second button switch is pressed and held by the user in order to enter, or a single predefined time interval can be used across the different modes.

Program code determines the control mode selected based on the generated mode selection data 202. For instance, control processing determines whether the generated mode selection data is indicative of the user selecting a first mode 204, and if so, the first mode is entered 206. The control process stays in the first mode until a predefined exit condition is detected 208. In one or more implementations, the predefined exit condition can be a defined user input obtained via the first and/or second button switches, and/or can be based on a lapsed time. Once the predefined exit condition is detected, the control returns to normal operational mode 210 (in one embodiment).

If the generated mode selection data 202 does not indicate the first mode, then program code determines whether a second mode has been selected 212. If so, then the control enters the second mode 214, and remains in the second mode until an exit second mode condition has occurred 216, based upon which, the control returns to normal operational mode 210.

If the generated mode selection data 202 does not indicate selection of the first or second modes, then program code, in one or more embodiments, determines that a third mode has been selected 218, and the control enters the third mode 220. The control stays in the third mode until a third mode exit condition has been detected 222, and once detected, returns to normal operational mode 210.

In one or more embodiments, the first, second and third modes of FIG. 2 are first, second and third special modes of the load control. For instance, in one embodiment, the first, second and third modes are a test mode, bypass mode, and settings mode, by way of example. In certain embodiments, the first mode is selected by the user pressing the first button switch for a predefined time interval, the second mode is entered by the user pressing the second button switch for the predefined time interval, and the third mode is entered by the user pressing both the first and second button switches together for the predefined time interval. In one embodiment, the predefined time interval could be a few seconds, such as 5 seconds, to differentiate from a normal mode toggling input to the control using either the first or second button switches.

By way of example, in one embodiment, the first mode can be a test mode, which the user enters by holding the first button switch for a predefined time interval, such as 5 seconds. Once entered, the one or more indicator devices signal that the user has entered the test mode. In the case of an indicator light device, the indicator light device can blink once per second while in test mode. The test mode is exited when either the control receives data that the first or second button switches have been pressed again for a defined time interval, or after a predefined period of time has elapsed.

Further, by way of example only, the second mode can be a bypass mode, such as an auto-bypass mode. The bypass mode, which would apply for load controls with occupancy-sensing capability, enables the user to temporarily disable the auto-on feature of the load control by holding, for instance, the second button switch for a predefined time interval, such as 5 seconds. The auto-on bypass mode exits when either the first or second button switch is again pressed by the user.

In one implementation, the third mode is a settings mode, such as discussed herein. In the settings mode, the control interface, including the first and second button switches and the one or more indicator devices, allow a user to navigate through a settings data structure in order for the user to configure or program the control. The first and second button switches and the one or more indicator devices are configured and located within the load control to allow the user to access the buttons and receive the signals from the indicator device(s) from the face of the load control, that is, without any disassembly or opening of the load control, including, without removal of a wall plate, or other cover, or other component of the load control.

Figure 3A:
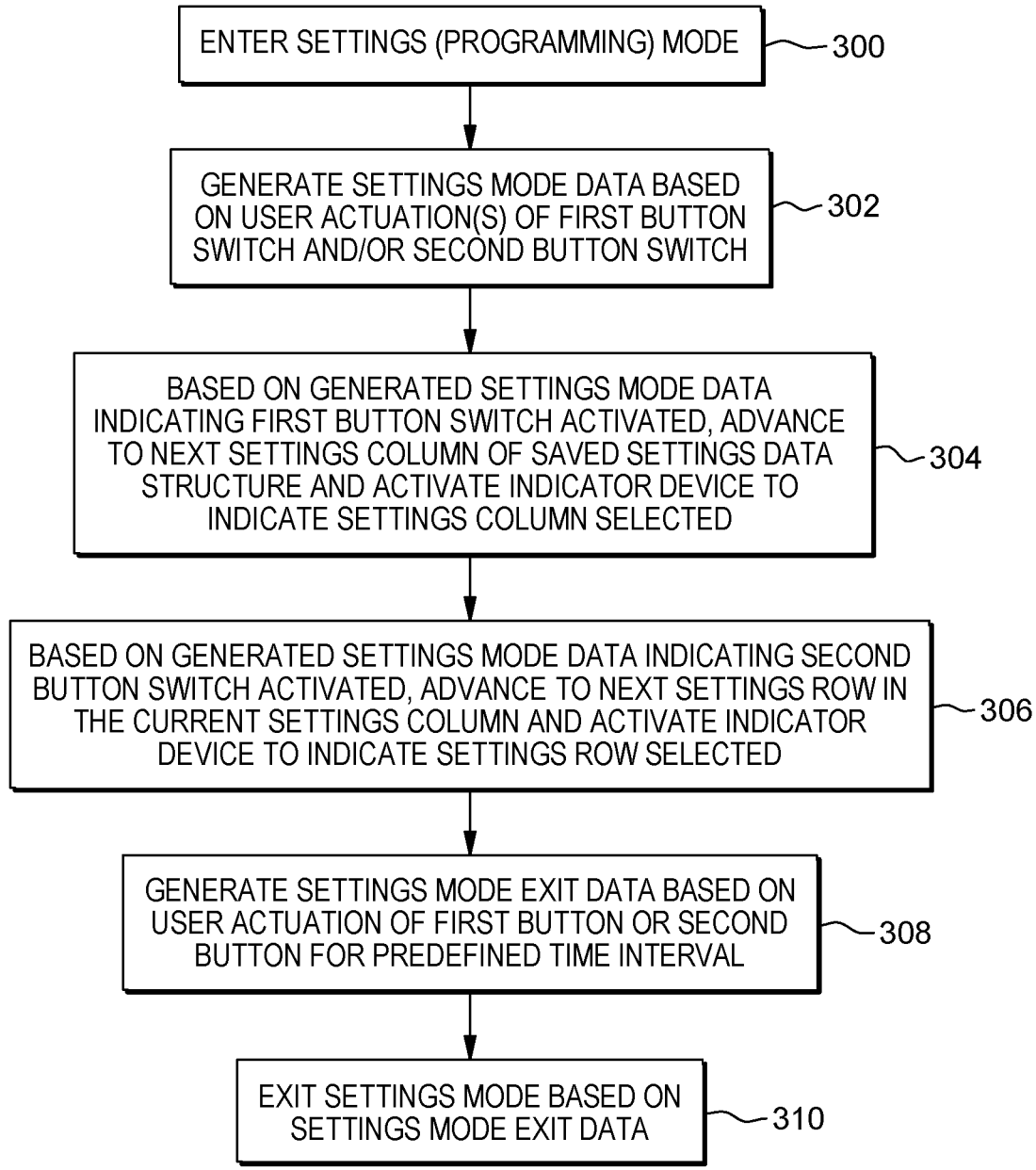
FIG. 3A depicts one embodiment of control processing in a settings mode of a load control with an integral control interface, in accordance with one or more aspects of the present invention.

FIG. 3A depicts one embodiment of control processing based on the user entering a settings mode 300, for instance, by pressing and holding both the first and second button switches together for a predefined time interval, such as for 5 seconds, as in the above example. As illustrated, settings mode data is generated based on the user pressing or actuating the first button switch and/or second button switch 302.

By way of example only, one embodiment of a settings data structure 320 is illustrated in FIG. 3B for an occupancy-sensing load control. In the example depicted, the data structure includes multiple columns 322, 324, 326, and multiple rows 330, 332, 334, 336. As shown, a first column 322 is a timer column which indicates the duration of time for which the load is to remain ON since the last detected motion within the monitored space. A second column 324 is a sensitivity column which, in one embodiment, specifies sensitivity to motion within the monitored space, allowing the user to adjust the major and minor detection ranges. The third column 326 is an optional ambient light-sensing column, and can be provided where the load control includes both an occupancy-sensing element and an ambient light-sensing element. The ambient light-sensing column allows the user to adjust an ambient light setting, where if the room or other monitored space is brighter than the set level, then the load will not be automatically turned ON.

As illustrated, the multiple rows of settings data structure 320 provide options for each column for user-selection and configuration of the load control.

Note that where the load control includes occupancy-sensing only, then just the first and second columns, 322, 324, would be included as part of settings data structure 320. Note also, that in the embodiment of FIG. 3B, a set to default option is also included, which allows the user the ability to reset the load control to factory default conditions, with one embodiment of the conditions being illustrated in the settings data structure as the bolded options within the respective columns.

Returning to FIG. 3A, based on the generated settings mode data indicating that the first button switch has been pressed by the user, then the control advances to the next settings column of the saved settings data structure, and activates the indicator device(s) to signal the settings column selected 304. For instance, in one embodiment, upon entering the settings mode of a factory default set control unit, the default setting may be to enter the timer column 322 (FIG. 3B) at the third row 334, in the case of an occupancy-sensing load control. The user advances through the settings data structure via the first button switch to move from one column to the next, with the indicator device(s) signaling the particular column that the user has advanced to. For instance, where the indicator device is an indicator light device, the column position can be identified by a number of flashes or blinks (e.g., column 1=1 blink/second).

As illustrated in FIG. 3A, based on the generated settings data indicating that the second button switch has been pressed, the control advances to the next settings row in the current settings column, and activates the indicator device(s) to indicate the settings row selected. In the example of FIG. 3B, changing the particular option within a column is accomplished by the user advancing through the rows of the column by pressing the second button switch, with the indicator device(s) differently indicating the row position selected by a number of blinks (e.g., row 1=1 blink/second). Note in this regard, the control interface is configured so that the indicator device(s) provides a different signal to indicate advancement through the columns compared with advancement through the rows. As noted, in certain implementations, the indicator device(s) can differentiate the advancements by different color signals, and/or by flashing light signals in different locations, in the case of light-based indicator devices.

In one implementation, a particular setting can be accepted once the user is in the desired settings cell of the data structure by, for instance, holding either the first button switch or the second button switch for a predefined time interval, such as for 5 seconds, to confirm the setting 308 and generate settings mode exit data, after which, the control exits the setting mode based on the generated settings mode exit data 310. Additionally, the control can be configured so that if a user does not accept the setting to which the user has advance within a predefined time interval, for instance, within 30 seconds, then the settings will not be changed, and the load control will exit the settings mode after expiration of that time interval. In one implementation, if the user holds both the first and second button switches at the same time in the settings mode, no action will be taken by the control due to that data. Further, in one implementation, outside the settings mode, for instance, when the load control is in normal operational mode, the setting mode can be entered by the user holding both the first and second button switches together for the predefined time interval. As noted, in certain embodiments, the indicator device(s) can be used by the control to signal when settings mode has been entered or exited, as well as to signal when a selected settings option has been saved.

Figure 4A:
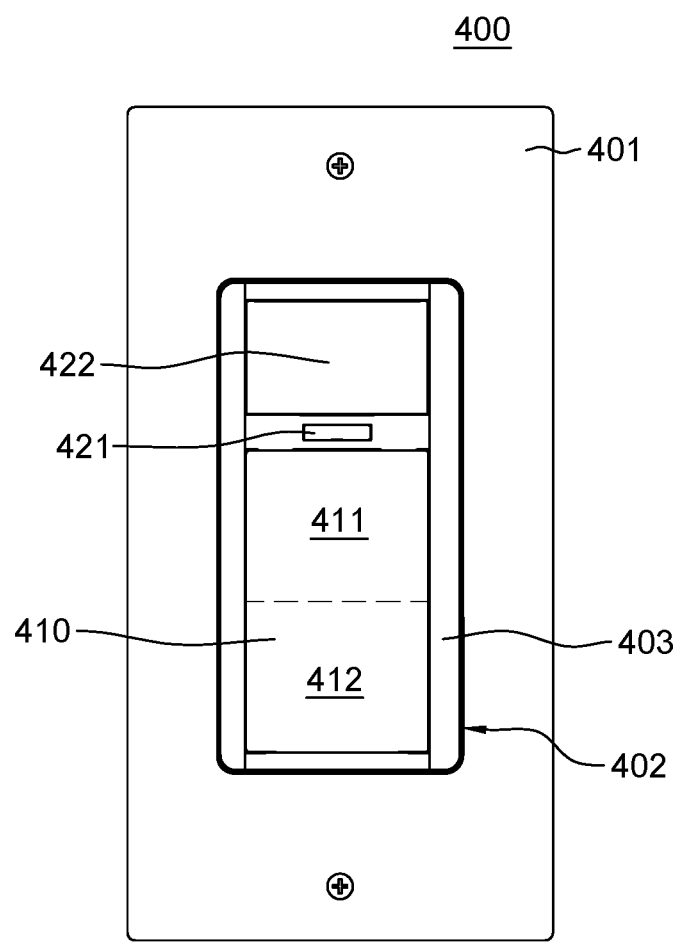
FIGS. 4A-4C depict different embodiments of a wall-mount configuration of a load control, in accordance with one or more aspects of the present invention.

By way of further explanation, FIG. 4A depicts one embodiment of a wall-mounted load control 400, in accordance with one or more aspects of the present invention. In the embodiment illustrated, load control 400 includes a wall plate 401 and a cover 402, such as a color change cover, which overlies, at least in part, the control assembly of the load control. In the embodiment illustrated, cover 402 includes a cover frame 403 and a button cover 410, which overlies and covers a first button switch and a second button switch, such as discussed herein. In operation, when a user presses button cover 410 in a first region 411, the first button switch below the button cover is selected, and when the user presses the button cover 410 in a second region 412, the second button switch is selected. Additionally, a first indicator device 421 and a second indicator device 422 are provided in this embodiment, which can be respective light indicators, such as respective light-emitting diode (LED) and associated light-pipe indicators, that illuminate at different times in different control modes of the control assembly, as described herein.

Figure 4B:
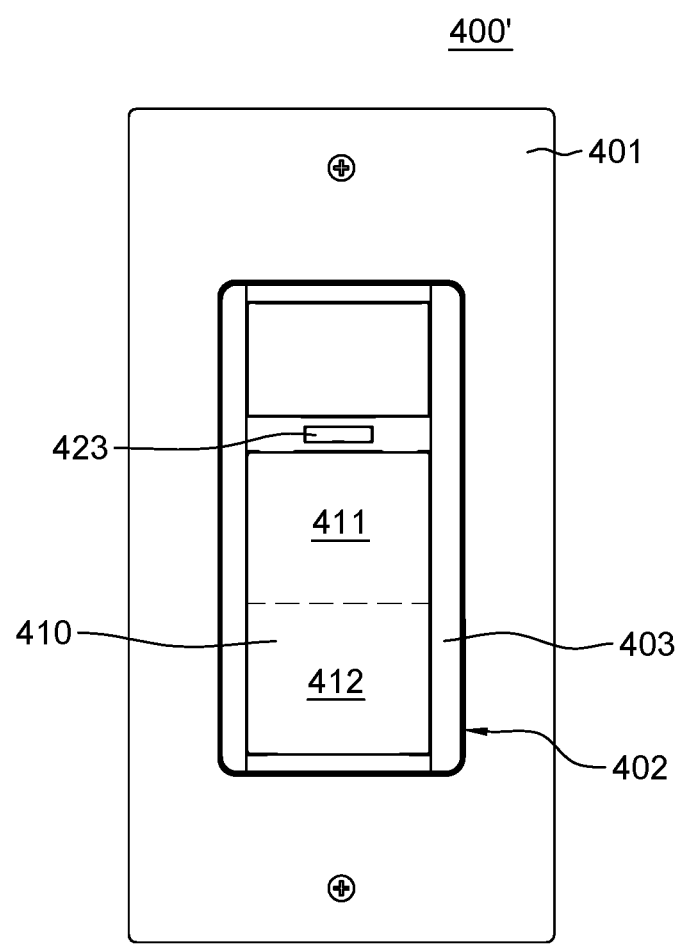
Figure 4C:
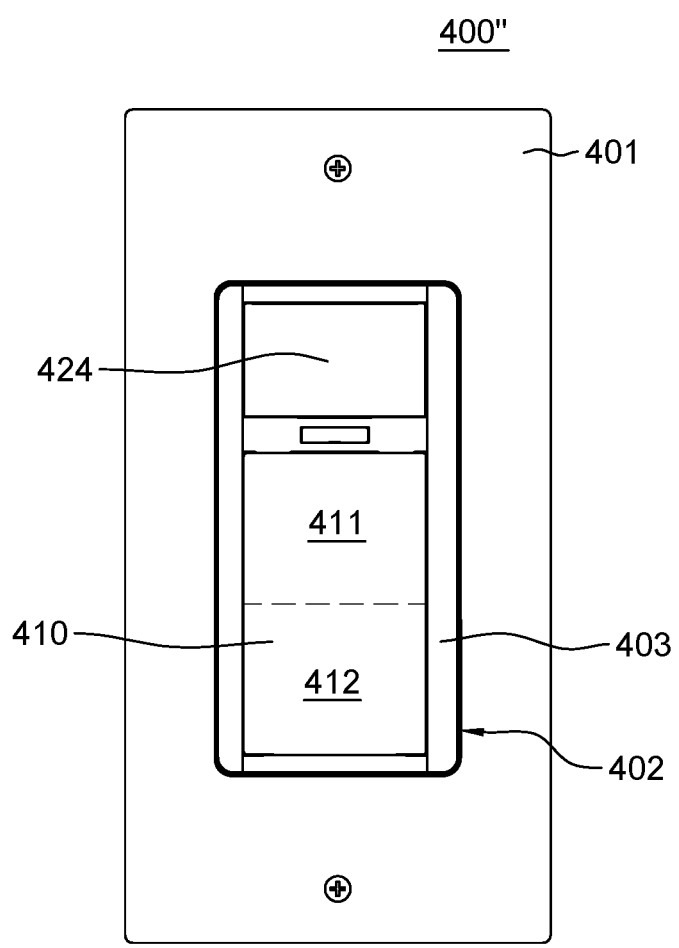

FIGS. 4B & 4C depict alternate embodiments of a wall-mounted control 400', 400", respectively, in accordance with one or more aspects of the present invention. In the embodiments illustrated, load controls 400', 400", are similar to load control 400 described above in connection with FIG. 4A, but rather use a single indicator device 423, 424, which replaces the first and second indicator devices of the embodiment of FIG. 4A. As explained herein, in one embodiment, indicator device 423, 424 can include one or more indicator lights (such as one or more light-emitting diodes) and an associated light-pipe indicator. The indicator device 423, 424 can be configured to signal different colors for different column locations or different row locations within, for instance, a settings data structure, as described. For instance, the indicator device can signal different colors for different columns locations within the settings data structure, and signal different numbers of flashes for different row locations within the settings data structure. Alternatively, the indicator device can signal different numbers of flashes for different column locations within the settings data structure, and signal different colors for different row locations within the settings data structure. In one implementation, the indicator device includes an optical element, such as a common light-pipe, and the different colors for the different column locations or different row locations within the settings data structure are signaled through the optical element. In this manner, different color lights can be combined to signal additional colors to provide, for instance, different information in different control modes of the control assembly.

By way of example only, in one or more implementations, load control 400 is a load control with occupancy-sensing capability. For instance, an occupancy-sensing load control can include any of a variety of sensor technologies, such as one or more passive infrared sensors (PIR), ultrasonic sensors (US), dual infrared-ultrasonic sensors, and the like.

In one or more embodiments, button cover 410 presents a user with a single accessible button or toggle, which in an operational mode of the control allows the user to, for instance, manually control switching ON or OFF the load. For instance, where the load control is an occupancy-sensing load control, with ambient light-sensing capability, and the control assembly is in an occupancy-sensing operational mode, with the monitored space darker than an ambient light level set, the load is automatically switched to an ON state by the load control. Alternatively, the user can switch ON the load by pressing button cover 410, which results in a pressing of the first button switch or second button switch below the button cover to manually switch the load when the control assembly is in normal operating mode. Further, the control assembly can automatically switch the load to an OFF state if no motion is detected within the monitored space for a defined time period, or if a user pushes button cover 410 to activate the first or second button switch to switch the load OFF. In this manner, such an occupancy-sensing load control provides automatic ON/OFF load control, as well as the ability for a user to manually override the automatic ON/OFF load control.

Further, in one or more implementations of an occupancy-sensing load control, the control assembly could be configured to be programmable between an occupancy-sensing operational mode and vacancy-sensing operational mode. In vacancy-sensing operational mode, when the load control is manually turned ON, the sensor assembly automatically turns OFF the load when motion is not detected for a defined interval. In the vacancy-sensing operational mode, the user can override this automatic feature by pressing button cover 410 to engage at least one of the first or second button switch to manually turn the load ON or OFF, as desired.

FIGS. 5A-7B depict a more detailed view of one embodiment of load control 400, in accordance with one or more aspects of the present invention. As noted, and by way of example only, load control 400 is configured with sensing capability, and more particularly, in one embodiment as an occupancy sensor or vacancy sensor, or other type of sensor for a monitored space. Note that this is one example only of a load control with integral control interface for user-configuring or user-programing of one or more data structures, such as one or more settings data structures of the load control. In one or more other embodiments, load control 400 could be configured without any sensing capability, such as the case with a dimmer-type load control with user-programmable features and an integral control interface, such as disclosed herein.

Figure 5A:
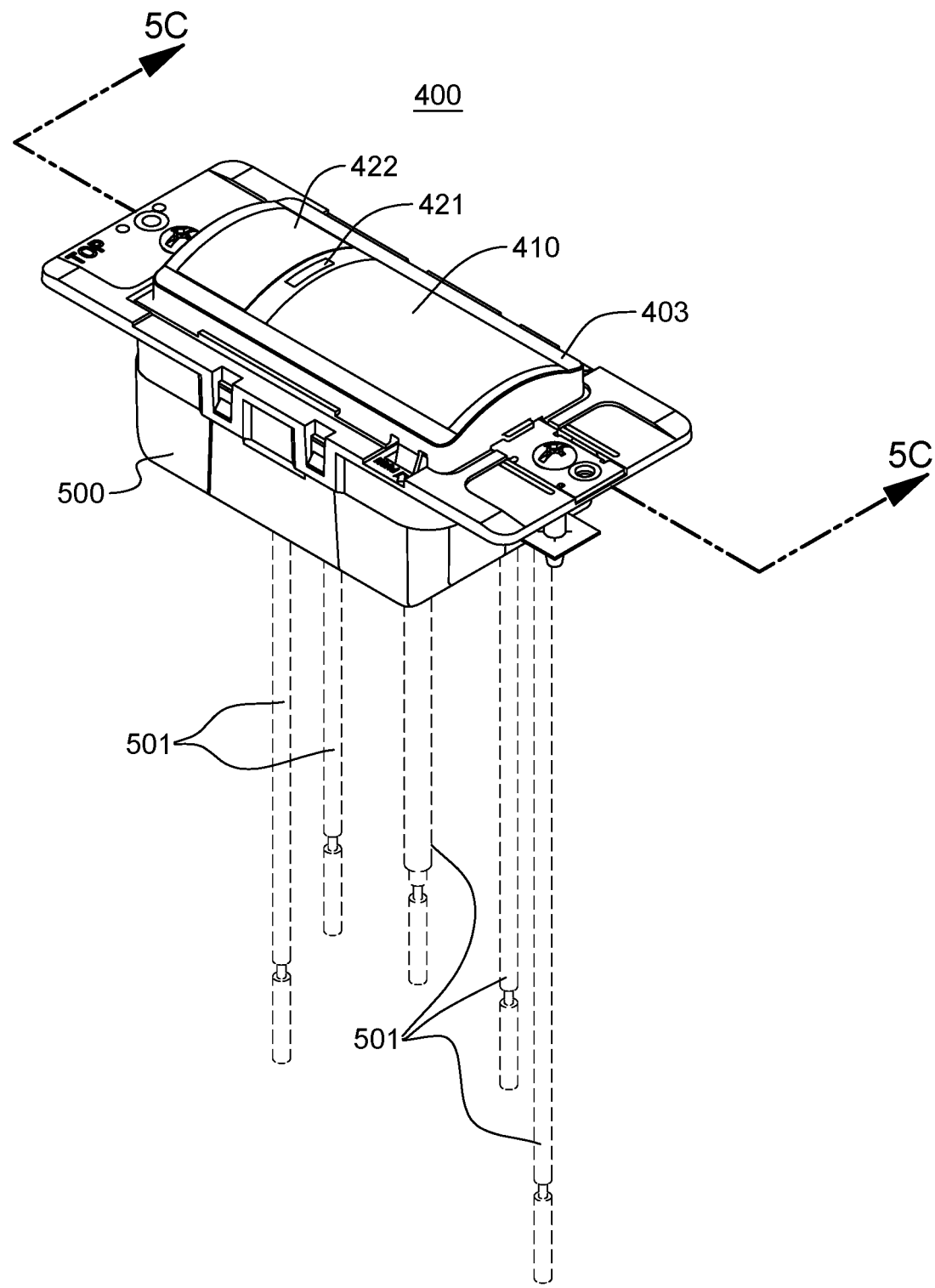
FIG. 5A further depicts one embodiment of the load control of FIG. 4, in accordance with one or more aspects of the present invention.
Figure 5B:
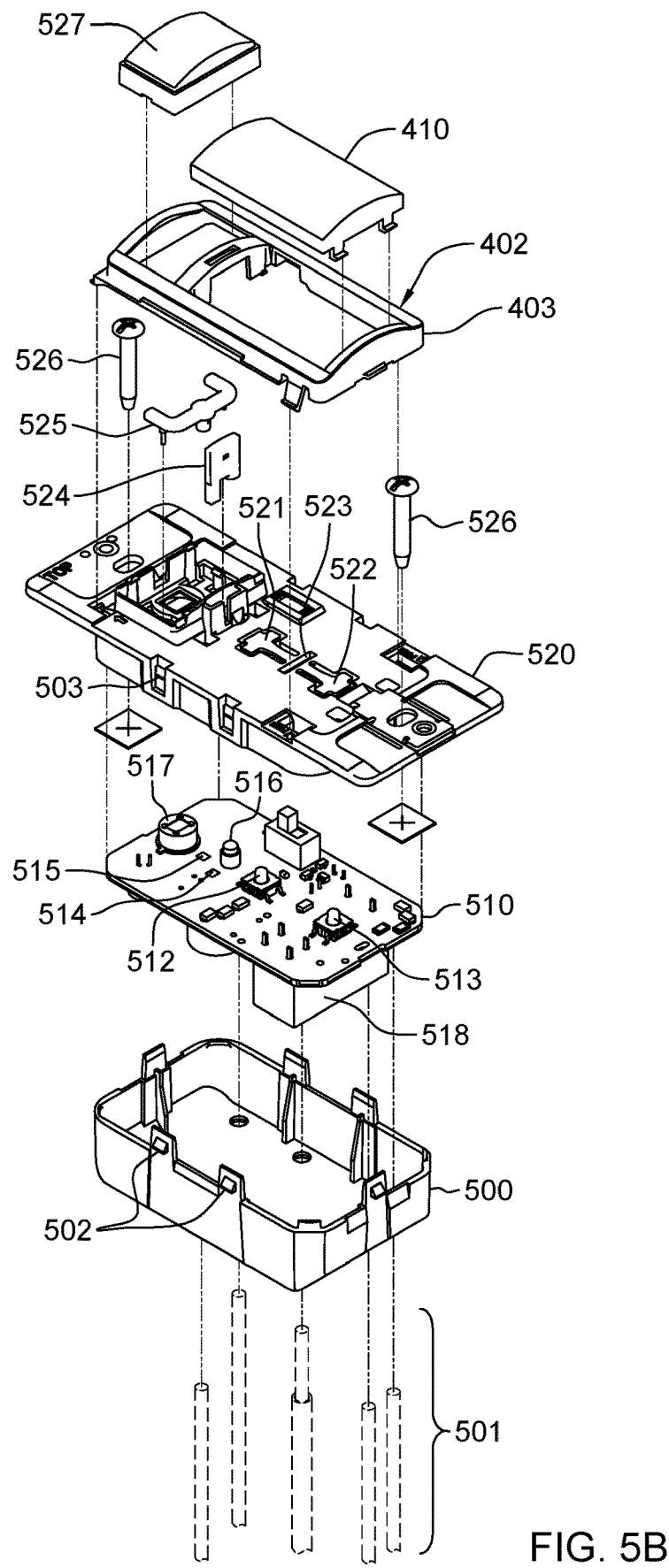
FIG. 5B is a partially exploded view of the load control of FIG. 5A, in accordance with one or more aspects of the present invention.
Figure 5C:
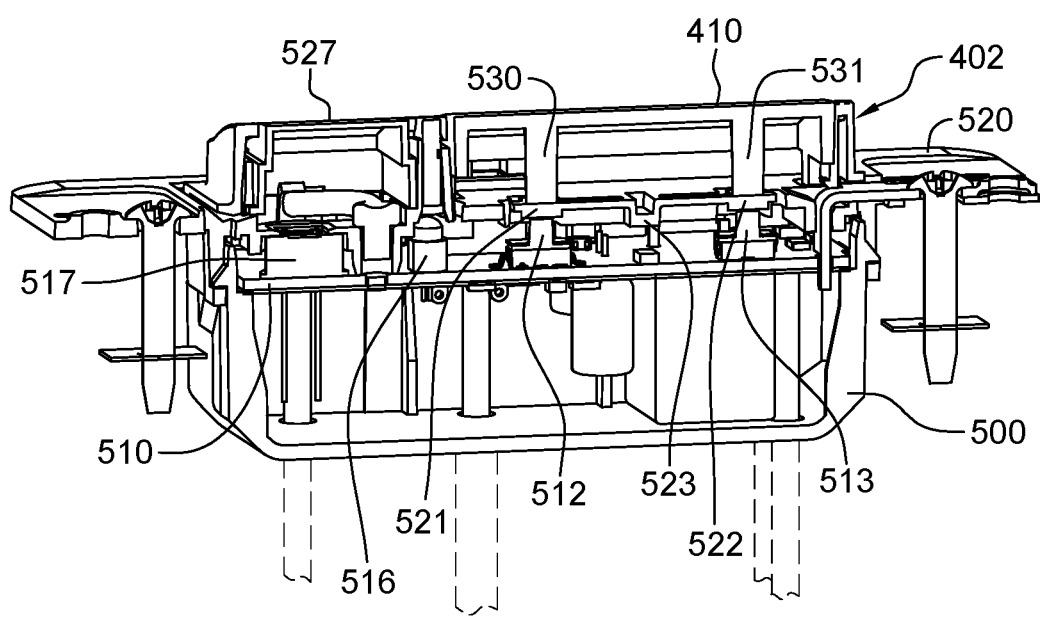
FIG. 5C is a cross-sectional elevational view of the load control of FIG. 5A, taken along line 5C-5C thereof, in accordance with one or more aspects of the present invention.

Referring collectively to FIGS. 5A-5C, cover 402 includes cover frame 403, movable button cover 410, and a cover lens 527 which overlies, in one embodiment, one or more sensing elements of the load control. Note that in operation, button cover 410 is pressable and inwardly moveable with reference to cover frame 403. As illustrated, cover 402 mechanically couples to a housing, including an upper housing 520 and a base housing 500 which accommodates, at least in part, an electrical device and a control assembly, such as described herein. In the embodiment illustrated, a circuit board 510 is provided for accommodating the electrical device, control assembly, and one or more aspects of the control interface. As illustrated, upper housing 520 is configured as a strap for mounting to, for instance, a wall-box, via one or more fasteners 526. Base housing 500 and upper housing 520 are mechanically coupled together via integrally-formed fastening elements 502, 503. In operation, wires (or lines) 501 connect to circuit board 510 and extend through base housing 500 to allow connection of the load control between, for instance, a power source and a load, as described herein. In one or more embodiments, upper housing 520 and base housing 500 are formed of an insulative material, such as a plastic material.

In the illustrated embodiment of FIGS. 5A-5C, circuit board 510 supports on upper and lower surfaces thereof, the electrical and electro-mechanical components of load control 400, including electrical device 518, such as a switching circuit or relay (in one or more embodiments), and a control or processing circuit as described herein including, for instance, a processor and associated memory, which are discussed further below with reference to FIG. 8. Additionally, circuit board 510 includes a first button switch 512 and a second button switch 513, as well as a first surface-mount, light-emitting diode (LED) 514 and a second surface-mount, light-emitting diode (LED) 515, with respective light-pipes 524, 525. Together, first LED 514 and light-pipe 524 form one embodiment of a first indicator 421 (FIG. 4A), and second LED 515 and light-pipe 525 form one embodiment of a second indicator 422 (FIG. 4A), which shines through a lens cover 527 (FIGS. 5A-5C), coupled (as noted) to frame 403 of cover 402. In one embodiment, cover 402 can be a color change cover or kit which can be removably clipped to, for instance, upper housing 520, as illustrated, and cover lens 527 is configured to refract infrared radiation onto an infrared sensor, in the case of an occupancy-sensing load control. As noted, in the embodiment depicted, this cover lens 527 also functions as a second indicator interface by locating indicator light 515 and associated light pipe 525 below the cover lens, that is, in addition to an occupancy-sensing element 517.

Circuit board 510 further includes, in one embodiment, an ambient light-sensing element 516, that is, in addition to occupancy-sensing element 517, such as a passive infrared sensor (PIR), in one embodiment.

Advantageously, in the load control embodiment of FIGS. 5A-5C, button cover 410 is provided over first button switch 512 and second button switch 513. As illustrated in FIG. 5C, button cover 410 is, in one or more embodiments, a single-piece, rigid cover pressable by a user to actuate either or both first button switch 512 and second button switch 513 via transfer of force through respective depending structures 530, 531 of button cover 410 across upper housing 520 to first button switch 512 and/or second button switch 513. As illustrated in FIG. 5B, upper housing 520 includes partially cut-out flexible members 521, 522, which flex downward from a central joint or location 523 formed in upper housing 520 such that, depending on where a user presses button cover 410, force is transferred to either first button switch 512, or second button switch 513, or both first and second button switches 512, 513. For instance, when the user presses in a first region 411 (FIG. 4A), force is transferred via structure 530 and flexible member 521 to first button switch 512, and when a user presses button cover 410 in a second region 412 (FIG. 4A), force is transferred via structure 531 and flexible member 522 to second button switch 513. When a user presses both the first and second regions of button cover 410 together, then both the first and second button switches are pressed.

As noted, the first and second button switches, and one or more indicator devices, together make up an integral control interface which allows a user to access and traverse through data structures of various sizes and content for different load controls. In this manner, the control interface can be used across a variety of load controls, including load controls with a sensing capability, or load controls without sensing capability, as in the case with a dimmer load control, with user-programmable features saved in an appropriate data structure. Note that the first and second button switches and one or more indicator devices are accessible and viewable, respectively, from the face of the load control, that is, through cover 402 of the load control, without any disassembly of the load control or opening of the load control. Further, button cover 410 advantageously provides a single surface for a user to press in order to actuate or toggle the first button switch and/or second button switch, as described herein.

Figure 6:
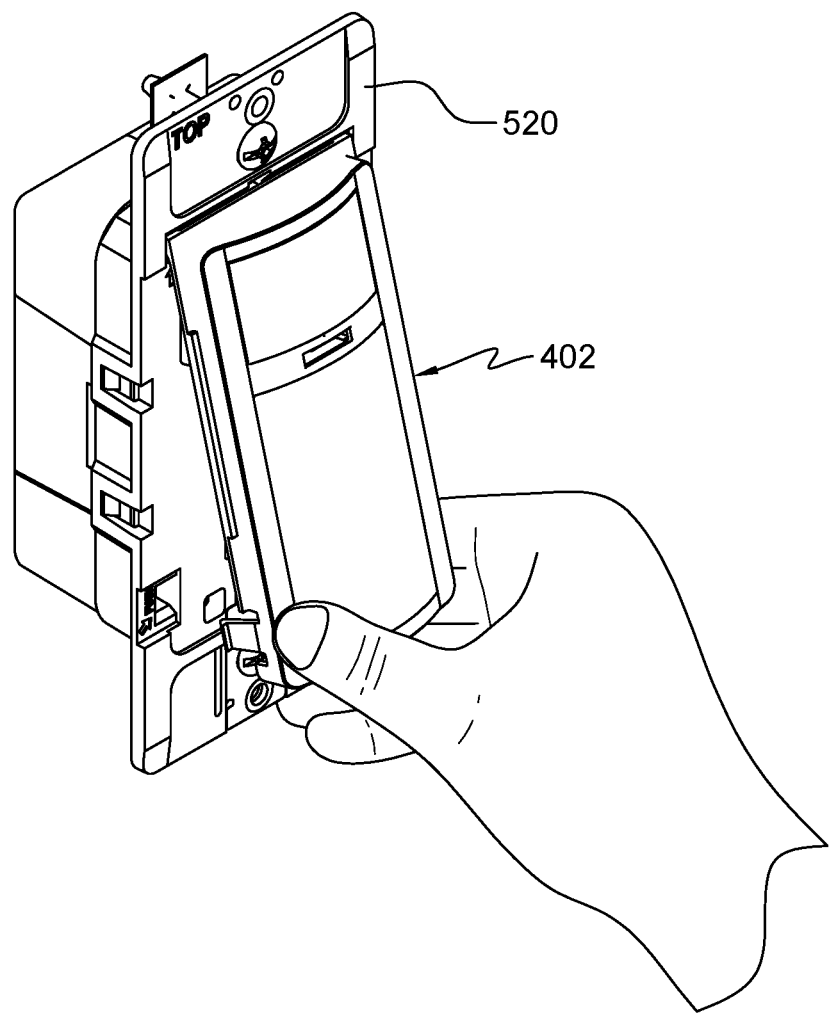
FIG. 6 illustrates one embodiment of the load control with the cover shown being removed to access one or more additional, user-programmable control switches, in accordance with one or more aspects of the present invention.
Figure 7A:
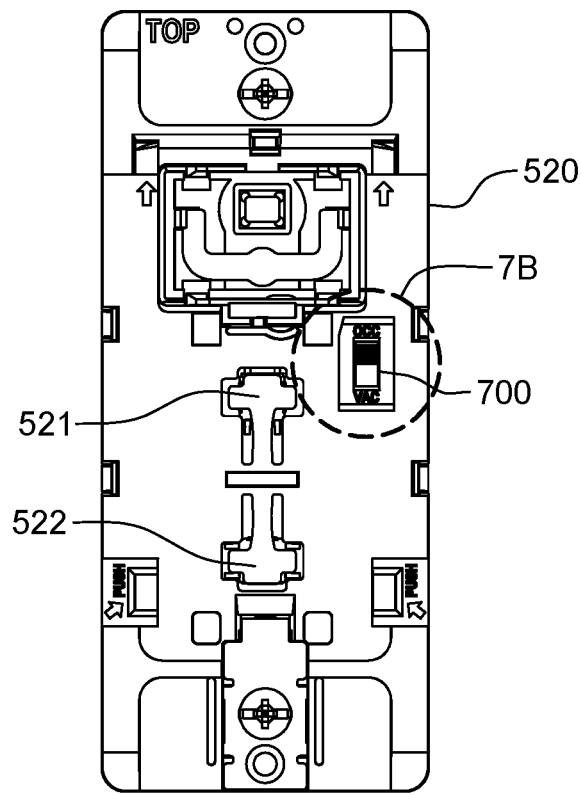
FIG. 7A is a plan view of one embodiment of the load control of FIG. 6 with the cover removed to expose a slide switch for transitioning the control assembly between an occupancy-sensing operational mode and a vacancy-sensing operational mode, in accordance with one or more aspects of the present invention.
Figure 7B:
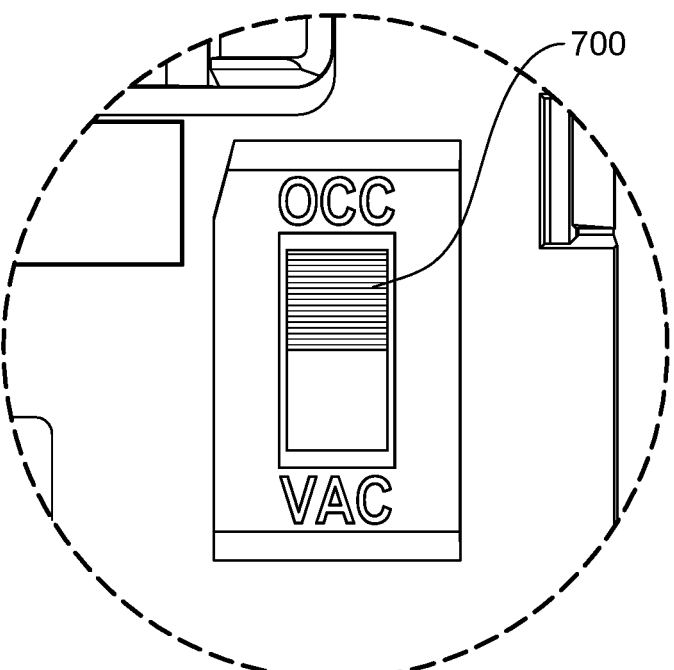
FIG. 7B is an enlarged partial depiction of the load control of FIG. 7A, taken along line 7B thereof, in accordance with one or more aspects of the present invention.

Depending on the number of special modes, one or more further load control features can be user-controlled by manually removing or opening cover 402 to expose upper housing 520, as illustrated in FIGS. 6-7B. As shown in FIGS. 6-7B, in one embodiment, a slide switch 700 can be provided extending through upper housing 520 (with flexible transfer elements 521, 522), as shown. Note with regard to FIGS. 6-7B, that no tools are required in order to remove cover 402 to expose slide switch 700, which in the embodiment illustrated, is a slide switch to allow user-setting of the load control as either an occupancy-sensing load control or a vacancy-sensing load control. In the configuration illustrated, clasps or clips are formed integral to cover 402 which engage corresponding formations in upper housing 520. By pressing in the clasps, the cover can be removed as illustrated in FIG. 6. Note that other special control modes can also be configured in a similar manner, that is, if further accessible modes are desired for a particular control load implementation beyond three modes, which are accessible as described above via the button cover 410 and first and second button switches 512, 513, without any disassembly or opening of the load control.

As noted, the occupancy-sensing load control of FIGS. 4A-7B is provided by way of detailed example only. Those skilled in the art should note that the integral control interface disclosed herein for user-configuring or programming of one or more features of the load control via a settings data structure can be integrated with a variety of load controls, including load controls without any sensing capability. In one example, the load control could be a dimmer-type load control with user-programmable features, with those features being programmed via a control interface, such as disclosed herein.

As described herein, in one or more implementations, a control assembly or system as presented includes a control or controller with memory and/or storage and a processing circuit or processor, where the memory stores instructions for execution by the processing circuit to perform actions such as described herein. In this regard, the control assembly can be regarded as a computing system or environment capable of executing program instructions.

FIG. 8 depicts one example of such a computer system and associated sensors and/or devices to incorporate and/or use aspects described herein. The computer system, which is referred to herein as a control, or controller, can be based on one or more of various system architectures and/or instruction set architectures, such as those offered by, e.g., ARM Holdings plc (Cambridge, England, United Kingdom), as an example.

FIG. 8 shows a control or computer system 800 for a load control such as described herein. For instance, in one embodiment, control 800 is an example implementation of control 121 in the load control schematic of FIG. 1.

Control 800 includes one or more processor(s) 802, for instance central processing unit(s) (CPUs) and/or microprocessors. A processor can include functional components used in the execution of instructions, such as functional components to fetch program instructions from locations such as cache or main memory, decode program instructions, and execute program instructions, access memory for instruction execution, and write results of the executed instructions. A processor 802 can also include one or more register(s) to be used by one or more of the functional components. Control 800 also includes memory 804, and is coupled to, or includes, input/output (I/O) devices 808, which may be coupled to processor(s) 802 and each other via one or more circuit board buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive (s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein. Further, memory 804 can include one or more settings data structures 807 of the load control, such as described herein.

Examples of I/O devices 808 include but are not limited to condition sensors, such as occupancy or vacancy sensors, environmental sensors, lights, sensor devices configured to sense light, proximity, body and/or ambient temperature, switches, such as button switches, indicators, such as indicator lights, etc. An I/O device can be incorporated into the control or computer system as shown, though in some embodiments an I/O device may be regarded as an external device coupled to the control or computer system through one or more I/O interfaces.

Control or computer system 800 may be operational with numerous general purpose or special purpose computing system environments or configurations. Control 800 can take any of various forms, well-known examples of which include, but are not limited to, a microcontroller, multiprocessor system(s), microprocessor-based system(s), systems-on-a-chip (SOCs), electronic control systems, load control switches and the like.

The present invention can be a control assembly, system, method, and/or computer program product, any of which may be configured to perform or facilitate aspects described herein.

In some embodiments, aspects of the present invention can take the form of a computer program product, which can be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a control assembly, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A load control, comprising:
   a wall-box housing;
   an electrical device to control electrical power to a load, the electrical device being disposed at least partially within the wall-box housing;
   a controller disposed at least partially within the wall-box housing, and being operatively coupled to control operation of the electrical device in an operational mode, the controller being user-programmable in a settings mode via a saved settings data structure comprising multiple control settings, the settings data structure including multiple columns and rows of control settings; and
   a control interface, the control interface comprising:
      a first button switch to select a column of the settings data structure in the settings mode of the controller for user-programming of the controller, the first button switch comprising a first electro-mechanical device, and the first button switch being selectable by a user without disassembly of the load control;
      a second button switch to select a row of the settings data structure in the settings mode of the controller for user-programming of the controller, the second button switch comprising a second electro-mechanical device, and the second button switch being selectable by the user without disassembly of the load control; and
      one or more light indicators to signal a selected column of the settings data structure in the settings mode of the controller, and to signal a selected row of the settings data structure in the settings mode of the controller; and
   wherein the controller includes multiple control modes, the settings mode being a first mode of the multiple control modes of the controller, and wherein the multiple control modes of the controller further include a second mode and a third mode, and engaging one of the first button switch or the second button switch for a predefined time interval transitions the controller into a predefined one of the first mode, second mode, or third mode, engaging the other of the first button switch or the second button switch for the predefined time interval transitions the controller into a predefined other one of the first mode, second mode, or third mode, and engaging both the first button switch and the second button switch together for the predefined time interval transitions the controller into a remaining one of the first mode, second mode, or third mode.

2. The load control of claim 1, wherein the one or more light indicators signal in a first color the column of the settings data structure in the settings mode of the controller, and signal in a second color the row of the settings data structure in the settings mode of the controller.

3. The load control of claim 1, wherein the one or more light indicators comprise a first light indicator to signal the selected column of the settings data structure in the settings mode of the controller, and a second light indicator to signal the selected row of the settings data structure in the settings mode of the controller.

4. The load control of claim 3, wherein the first light indicator signals the column of the settings data structure in the settings mode of the controller by at least one of flashing a number of times corresponding to location of the column within the settings data structure or signaling a color corresponding to location of the column within the settings data structure, and the second light indicator signals the row of the settings data structure in the settings mode of the controller by at least one of flashing a number of times corresponding to location of the row within the settings data structure or signaling a color corresponding to location of the row within the settings data structure.

5. The load control of claim 1, wherein the one or more light indicators signal different colors for different column locations or different row locations within the settings data structure.

6. The load control of claim 5, wherein the one or more light indicators further include an optical element, and the different colors for the different column locations or different row locations within the settings data structure are signaled through the optical element.

7. The load control of claim 1, wherein the multiple columns of the settings data structure comprise multiple control setting types, and the multiple rows of the settings data structure comprise multiple settings options for a respective control setting type.

8. The load control of claim 1, wherein in normal operation of the controller, user-pressing of at least one of the first button switch or the second button switch causes the controller to transition the electrical device to switch the load between an ON state and an OFF state.

9. A load control, comprising:
   a wall-box housing;
   an electrical device to control electrical power to a load, the electrical device being disposed at least partially within the wall-box housing;
   a controller disposed at least partially within the wall-box housing, and being operatively coupled to control operation of the electrical device in an operational mode, the controller being user-programmable in a settings mode via a saved settings data structure comprising multiple control settings, the settings data structure including multiple columns and rows of control settings; and
   a control interface, the control interface comprising:
      a first button switch to select a column of the settings data structure in the settings mode of the controller for user-programming of the controller, the first button switch comprising a first electro-mechanical device, and the first button switch being selectable by a user without disassembly of the load control;

a second button switch to select a row of the settings data structure in the settings mode of the controller for user-programming of the controller, the second button switch comprising a second electro-mechanical device, and the second button switch being selectable by the user without disassembly of the load control; and one or more light indicators to signal a selected column of the settings data structure in the settings mode of the controller, and to signal a selected row of the settings data structure in the settings mode of the controller;

wherein the user enters the settings mode of the controller by pressing and holding the first button switch, the second button switch, or both the first and second button switches, for a predefined time interval; and wherein the controller includes multiple control modes, the settings mode being a first mode of the multiple control modes of the controller, and wherein the multiple control modes of the controller further include a second mode and a third mode, and engaging one of the first button switch or the second button switch for a predefined time interval transitions the controller into a predefined one of the first mode, second mode, or third mode, engaging the other of the first button switch or the second button switch for the predefined time interval transitions the controller into a predefined other one of the first mode, second mode, or third mode, and engaging both the first button switch and the second button switch together for the predefined time interval transitions the controller into a remaining one of the first mode, second mode, or third mode.

10. The load control of claim 9, wherein the one or more light indicators signal in a first color the column of the settings data structure in the settings mode of the controller, and signal in a second color the row of the settings data structure in the settings mode of the controller.

11. The load control of claim 9, wherein the one or more light indicators comprise a first light indicator to signal the selected column of the settings data structure in the settings mode of the controller, and a second light indicator to signal the selected row of the settings data structure in the settings mode of the controller.

12. The load control of claim 11, wherein the first light indicator signals the column of the settings data structure in the settings mode of the controller by at least one of flashing a number of times corresponding to location of the column within the settings data structure or signaling a color corresponding to location of the column within the settings data structure, and the second light indicator signals the row of the settings data structure in the settings mode of the controller by at least one of flashing a number of times corresponding to location of the row within the settings data structure or signaling a color corresponding to location of the column within the settings data structure.

13. A load control, comprising:
a wall-box housing;
an electrical device to control electrical power to a load, the electrical device being disposed at least partially within the wall-box housing;
a sensing element, the sensing element to sense a condition of a monitored space; and a controller disposed at least partially within the wall-box housing, and being operatively coupled to the sensing element and the electrical device, the controller controlling operation of the electrical device in an operational mode based, at least in part, on a sensed condition of the monitored space, and the controller being user-programmable in a settings mode via a saved settings data structure comprising multiple control settings, the settings data structure including multiple columns and rows of control settings; and a control interface, the control interface comprising:
a first button switch to select a column of the settings data structure in the settings mode of the controller for user-programming of the controller, the first button switch comprising a first electro-mechanical device, and the first button switch being selectable by a user without disassembly of the load control;

a second button switch to select a row of the settings data structure in the settings mode of the controller for user-programming of the controller, the second button switch comprising a second electro-mechanical device, and the second button switch being selectable by the user without disassembly of the load control; and one or more light indicators to signal the selected column of the settings data structure in the settings mode of the controller, and to differently signal the selected row of the settings data structure in the settings mode of the controller; and wherein the multiple control modes of the controller further include a second mode and a third mode, and engaging one of the first button switch or the second button switch for the predefined time interval transitions the controller into a predefined one of the first mode, second mode, or third mode, engaging the other of the first button switch or the second button switch for the predefined time interval transitions the controller into a predefined other one of the first mode, second mode, or third mode, and engaging both the first button switch and the second button switch together for the predefined time interval transitions the controller into a remaining one of the first mode, second mode, or third mode.

14. The load control of claim 13, wherein the one or more light indicators comprise a first light indicator to signal the selected column of the settings data structure in the settings mode of the controller, and a second light indicator to signal the selected row of the settings data structure in the settings mode of the controller.

15. The load control of claim 14, wherein in the operational mode of the controller, one of the first light indicator or the second light indicator illuminates when the condition is detected within the monitored space, and the other of the first light indicator and the second light indicator illuminates when the load is in an OFF state to operate as a locator light for the load control.

16. The load control of claim 14, wherein the first light indicator signals the column of the settings data structure in the settings mode of the controller by at least one of flashing a number of times corresponding to location of the column within the settings data structure or signaling a color corresponding to location of the column within the settings data structure, and the second light indicator signals the row of the settings data structure in the setting mode of the controller by at least one of flashing a number of times corresponding to location of the row within the setting data structure or signaling a color corresponding to location of the column within the settings data structure.

17. The load control of claim 13, wherein the controller includes multiple control modes, the settings mode being a first mode of the multiple control modes of the controller, wherein the first mode is entered by the user selecting a predefined one, or both, of the first button switch or the second button switch for a predefined time interval.

\* \* \* \* \*